US009382992B2

United States Patent
Vanderpool et al.

(10) Patent No.: US 9,382,992 B2
(45) Date of Patent: Jul. 5, 2016

(54) CONTROL OF LOCKING DIFFERENTIAL

(71) Applicant: Ford Global Technologies, LLC, Dearborn, MI (US)

(72) Inventors: Lucas Michael Vanderpool, Detroit, MI (US); Jacob Martin Povirk, Franklin, MI (US); Jihong Guo, Ann Arbor, MI (US); Patrick Meloche, Northville, MI (US); Brian Carl, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 14/497,426

(22) Filed: Sep. 26, 2014

(65) Prior Publication Data

US 2016/0091071 A1  Mar. 31, 2016

(51) Int. Cl.
| | |
|---|---|
| *F16H 48/30* | (2012.01) |
| *F16H 48/24* | (2006.01) |
| *B60K 23/04* | (2006.01) |
| *F16H 48/34* | (2012.01) |
| *F16H 48/08* | (2006.01) |
| *F16H 57/04* | (2010.01) |
| *F16H 48/20* | (2012.01) |

(52) U.S. Cl.
CPC ............... *F16H 48/24* (2013.01); *B60K 23/04* (2013.01); *F16H 48/08* (2013.01); *F16H 48/34* (2013.01); *F16H 57/0405* (2013.01); *F16H 2048/204* (2013.01)

(58) Field of Classification Search
CPC ..... F16H 48/24; F16H 57/0405; F16H 48/08; F16H 2048/204
See application file for complete search history.

(56) References Cited

U.S. PATENT DOCUMENTS

| | | | | |
|---|---|---|---|---|
| 3,430,519 | A * | 3/1969 | Roper ..................... | F16H 48/08 192/35 |
| 4,884,470 | A * | 12/1989 | Onoue .................. | F16D 35/005 475/237 |
| 4,895,217 | A | 1/1990 | Hueckler et al. | |
| 5,105,900 | A | 4/1992 | Adler et al. | |
| 6,361,466 | B1 | 3/2002 | Kyrtsos | |
| 6,755,763 | B1 * | 6/2004 | Goto ....................... | F16H 48/08 192/35 |
| 7,553,255 | B2 * | 6/2009 | Torres .................... | B60K 17/20 180/249 |
| 8,109,853 | B2 | 2/2012 | Povirk et al. | |
| 8,156,843 | B2 | 4/2012 | Povirk et al. | |
| 9,162,569 | B2 * | 10/2015 | Dean ....................... | B60K 23/04 |
| 2007/0142157 | A1 * | 6/2007 | Nofzinger ............... | F16H 48/08 475/231 |
| 2011/0269595 | A1 * | 11/2011 | Marsh ..................... | F16H 48/30 475/220 |
| 2014/0100750 | A1 | 4/2014 | Stares | |
| 2014/0254623 | A1 * | 9/2014 | Paielli .................... | G01N 25/72 374/10 |
| 2015/0183320 | A1 * | 7/2015 | Cheng .................... | B60K 23/04 701/69 |

* cited by examiner

*Primary Examiner* — David J Hlavka
(74) *Attorney, Agent, or Firm* — James Dottavio; Brooks Kushman P.C.

(57) ABSTRACT

A locking differential includes a dog clutch configured to selectively couple a carrier to an axle shaft in response to magnetic forces generated by electrical current in a coil. A method of operating the differential is adapted to avoid failed engagement attempts that could potentially damage the dog clutch. If a driver commands engagement of the locking feature while a differential speed, a controller waits to command engagement of the dog clutch until the differential speed decreases below a threshold. The controller measures or infers a temperature of the differential fluid and adjusts the threshold to higher values when the temperature is cold.

15 Claims, 3 Drawing Sheets

CONTROL OF LOCKING DIFFERENTIAL

TECHNICAL FIELD

This disclosure relates to the field of vehicle controls. More particularly, the disclosure pertains to control of a locking differential.

BACKGROUND

When a vehicle turns, wheels on one side of the vehicle must travel farther than wheels on the other side of the vehicle. To accommodate this, many vehicles use differentials which split power from a transmission output between left and right axle shafts while permitting speed differences between the axle shafts. The torque delivered to each axle shaft is approximately equal. When the vehicle encounters poor road conditions, the behavior of the differential may be disadvantageous. If one of the wheels loses traction, the torque applied at that wheel rapidly decreases. The torque equalizing effect reduces the torque applied at the opposite wheel even though the opposite wheel may still have acceptable traction. To remedy this drawback, some vehicles are equipped with locking differentials which selectively lock the left and right axles such that they rotate in unison. When in a locked condition, the differential does not permit speed differences, but also does not equalize the torque. The locking feature is typically engaged only for road conditions with limited traction. In these conditions, slight tire slip accommodates the difference in distance travelled by the wheels during cornering. The locking feature may be engaged in response to direct driver command.

SUMMARY OF THE DISCLOSURE

A locking differential includes an input shaft, first and second output shafts, gearing configured to distribute power from the input shaft to the output shafts and to constrain the speeds of the shafts, a clutch configured to operatively selectively couple the first output shaft to the second output shaft, and a controller. The controller is programmed to adjust a threshold in response to changes in temperature of a differential fluid and to respond to a locking command while a measured differential speed exceeds the threshold by waiting until the speed difference decreases below the threshold and then commanding engagement of the clutch. The input shaft may be a driveshaft and the first and second output shafts may be left and right axle shafts, respectively.

A method of controlling a locking differential includes periodically measuring a speed difference between a first output shaft and a second output shaft and responding to a locking command by waiting until the speed difference decreases below a threshold and then commanding engagement of a lockup clutch. The method may further include adjusting the threshold in response to changes in a temperature of fluid in the differential. The temperature of the fluid may be measured using a temperature sensor. Alternatively, the fluid temperature may be inferred based on ambient temperature, soak time, and a vehicle speed history. As another alternative, the fluid temperature may be inferred by periodically measuring a temperature of a transmission fluid and inferring the temperature of the differential fluid based on the temperature of the transmission fluid.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
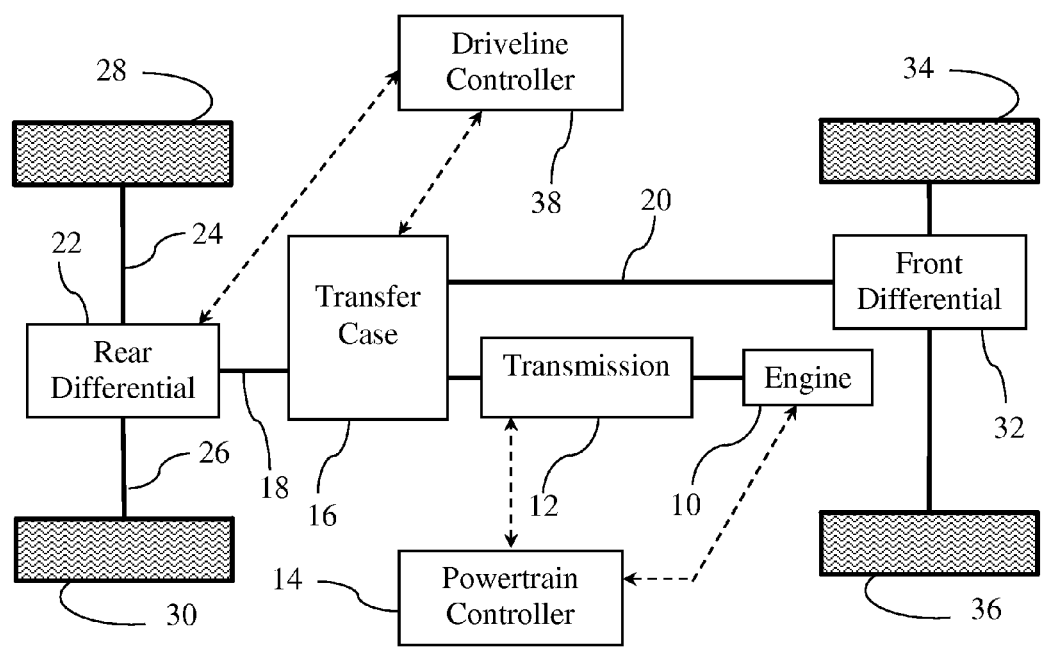
FIG. 1 is a schematic illustration of a vehicle powertrain.

FIG. 1 illustrates an exemplary four wheel drive powertrain and driveline configuration. Solid lines indicate the flow of mechanical power. Dotted lines indicate the flow of information signals. Power is provided by engine 10. Transmission 12 adapts the speed and torque to suit current vehicle needs. Engine 10 and transmission 12 may respond to signals from a powertrain controller 14. Transfer case 16 divides the power between rear driveshaft 18 and front driveshaft 20. Rear differential 22 divides the power delivered by rear driveshaft 18 between a left rear axle 24 and a right rear axle 26, driving left rear wheel 28 and right rear wheel 30 respectively. Similarly, front differential 32 divides the power delivered by front driveshaft 20 between left front wheel 34 and right front wheel 36. Driveline controller 38 may adjust the manner in which transfer case 16, rear differential 22, and front differential 32 divide the power. Driveline controller 38 and powertrain controller 14 may be separate communicating controllers or may be a single integrated controller.

Figure 2:
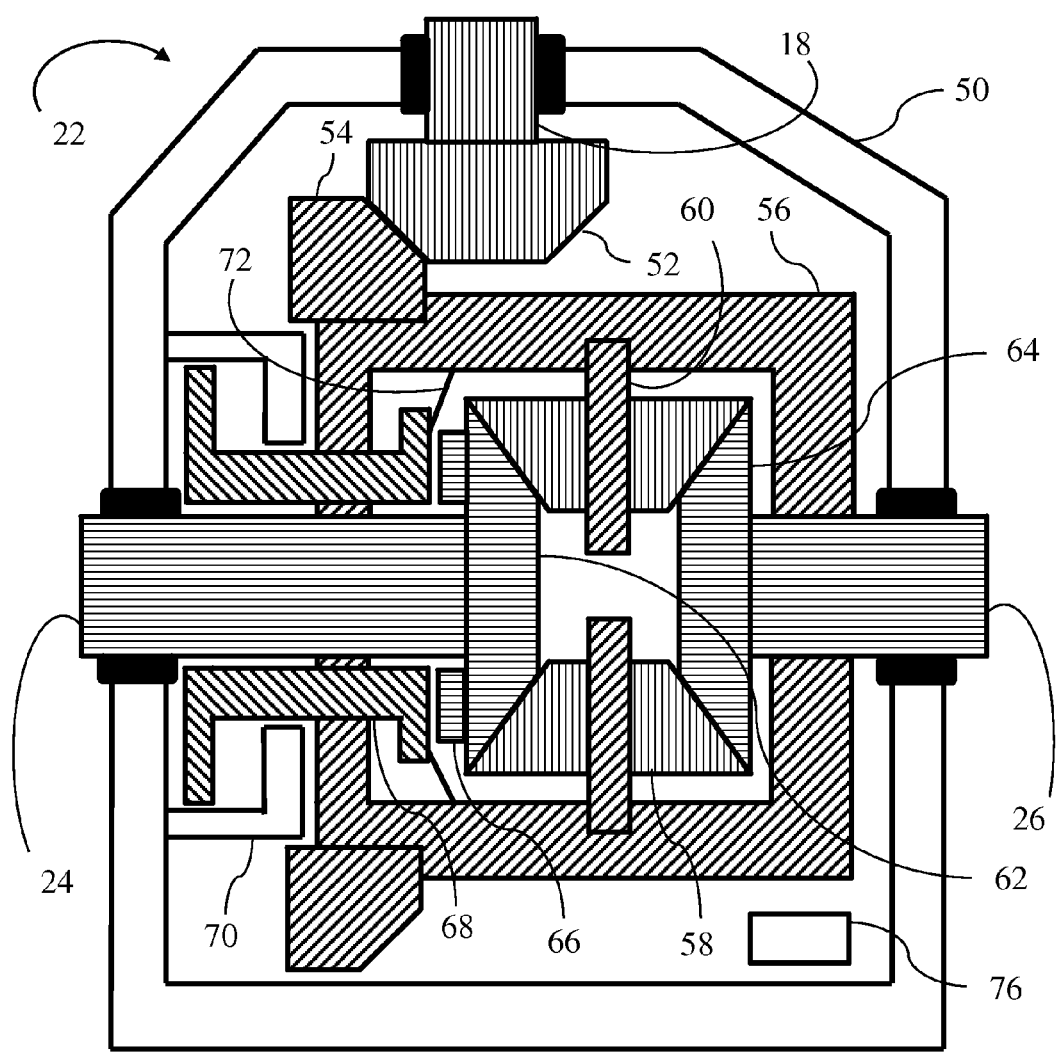
FIG. 2 is a schematic illustration of a locking differential.

FIG. 2 illustrates an electronic locking rear differential 22 configured to distribute power from driveshaft 18 to left axle shaft 24 and right axles shaft 26. Differential housing 50 may be fixed to vehicle structure or may translate with the left and right axle shafts. In either embodiment, housing 50 does not rotate with respect to the vehicle. Beveled pinion gear 52 is fixed to driveshaft 18 and meshes with beveled ring gear 54. Beveled pinion gear 52 may be physically offset such that the axis of driveshaft 18 passed below the axis of axle shafts 24 and 26, establishing a hypoid gear relationship. Beveled ring gear 54 is fixed to carrier 56. Beveled planet gears 58 are supported for rotation about pins 60 fixed to carrier 56. Beveled left side gear 62 is fixed to left axle shaft 24 and meshes with each of the beveled planet gears 58. Similarly, beveled right side gear 64, equal in size to left side gear 62, is fixed to right axle shaft 26 and meshes with each of the beveled planet gears 58. Power is transferred from driveshaft 18 to pinion gear 52 to ring gear 54 and then to carrier 56. From carrier 56, the power is transferred to the planet gears 58 through the pins 60. The force exerted at the center of each planet gear 58 by the pin is reacted by forces on the gear teeth exerted by the left and right side gears 62 and 64. The forces on the teeth of the side gears produce torque on the left and right axle shafts 24 and 26. To balance the forces on each planet gear, the forces on the side gears are equal. Therefore, the torque on the left axle shaft is equal to the torque on the right axle shaft. When the planet gears 58 rotate with respect to the carrier, the left axle shaft and the right axle shaft speeds differ from one another. In all operating conditions, however, the speed of the carrier is equal to the median speed of the left and right axle shafts. The speed and torque relationships of the beveled gear differential shown in FIG. 2 may be achieved with other gearing arrangements including a double pinion planetary gear set.

Distributing power between the axle shafts such that the two shafts have equal torque but potentially unequal speed is desirable in most driving conditions. When the vehicle turns a corner with good traction on both tires, the tire on the outside of the turn is allowed to rotate faster than the tire on the inside of the turn. However, this characteristic is undesirable when one wheel loses traction and the other wheel retains traction. For example, if the right wheel loses traction, then the torque on the right wheel acts only to increase the speed of the right wheel. To avoid spinning the right tire, torque on the right axle must be reduced by reducing driveshaft torque, which also reduces the torque directed to the left wheel. Even though the left wheel still has traction, the differential cannot direct the available power to the left wheel to continue propelling the vehicle. In this circumstance, it is preferable to distribute power between the axle shafts such that the two shafts have equal speed but potentially different torque.

The two axle shafts can be forced to rotate at the same speed by coupling the axle shafts directly to one another, by coupling one of the two axle shafts to the carrier, or by preventing the planet gears from rotating with respect to the carrier. The differential of FIG. 2 includes a dog clutch that selectively couples the left side gear 62 to the carrier 56, operatively coupling the axle shafts. A set of dog teeth 66 are fixed to left side gear 62 opposite the beveled gear teeth. Piston 68 rotates with carrier 56. A portion of piston 68 extends through holes in carrier 56. When current is supplied to coil 70 which is fixed to housing 50, piston 68 is pulled toward to right such that teeth on the piston engage the teeth 66 on left side gear 62. The current may be supplied by driveline controller 38 in response to a driver request. When the electrical current is removed, return spring 72 forces the piston back to the left. When the dog clutch is engaged, carrier 56, left axle shaft 24, and right axle shaft 26 all rotate at the same speed. The torque exerted on carrier 56 by ring gear 54 is transferred to the axle shafts by two different mechanisms. Some of the torque may be transferred through the pins 60 and the side gears as described above. This portion of the torque is distributed equally to the two axle shafts. The remaining torque is transferred through the dog clutch from carrier 56 only to left axle shaft 62. If the right wheel loses traction, then almost all of the torque is transferred through the dog clutch to the left wheel. If the left wheel loses traction, then torque that is transferred through the pins and planets to the left side gear is circulated back to the carrier 56 through the dog clutch such that almost all of the torque is ultimately sent to the right wheel.

Although FIG. 2 illustrates rear differential 22, front differential 32 may be structured similarly. Transfer case 16 may utilize a center differential to distribute power between rear driveshaft 18 and a front driveshaft 20. A center differential may be biased to deliver unequal torques to the front and rear driveshafts although the torques are proportional under normal conditions. A center differential may also employ a locking feature similar to the mechanism described above to transition to an equal speed, variable torque split mode of operation. Front wheel drive vehicles also employ a differential although it may be integrated into a common housing with the transmission. In a front wheel drive application, power is commonly transferred from the transmission gearing to a differential carrier by a chain or by non-beveled helical axis transfer gears.

Although FIG. 2 illustrates an electro-magnetically actuated dog clutch, other types of clutches may be employed. The clutch may use friction to couple the rotating elements as opposed to couple the rotating elements as opposed to positive engagement. Some embodiments may utilize a two-stage clutch wherein the actuator engages a pilot clutch with relatively low torque capacity and the pilot clutch causes engagement of a secondary clutch to couple the rotating components. In some embodiments, the clutch may be actuated by increasing the pressure of a fluid to move a piston. In some embodiments, a spring may bias the clutch to the engaged state and a controlled actuating force may bias the clutch to the disengaged state.

Differential housing 50 may be partially filled with fluid such as hypoid gear lube. This fluid performs several functions including providing lubrication and dissipating heat generating at the gear interfaces. When the vehicle is stationary, the fluid collects in the lowest portion of the housing 50. When the vehicle moves, the rotating gears distribute the oil to each of the important interfaces. The viscosity of the fluid various based on its temperature. At very low temperatures, the viscosity may be very high. Temperature sensor 76 transmits a signal to controller 38 indicating the fluid temperature.

Under certain circumstances, activation of the coil 70 may generate insufficient force to cause piston 68 to engage gear teeth 66. When engagement fails, the gear teeth on piston 68 bounce off the gear teeth 66 on left side gear 62. This causes accelerated wear of the gear teeth impeding future engagements. In severe cases, gear teeth may break off entirely. In addition to impeding the ability to lock the differential in the future, the pieces of metal may be carried by the fluid into the gear meshes or other parts causing secondary failures. Therefore, it is important to avoid failed engagement attempts. Several factors strongly influence the likelihood of an engagement failure. First, the likelihood of a failure increases as the relative speed between the carrier 56 and the left side gear 62 increases. This relative speed is proportional to the relative speed between the left axle 24 and the right axle 26 which is called the differential speed. Second, the likelihood of failure increases as the fluid viscosity increases because fluid must be pushed out of the way by the moving piston. This is primarily at problem at very low temperatures. Third, the likelihood of failure is related to the amount of current that is generated in coil 70. This, in turn, is determined by the battery voltage available and by the resistance of the coil. Low current is primarily a problem at high temperatures because the resistance of the coil increases at high temperatures.

Figure 3:
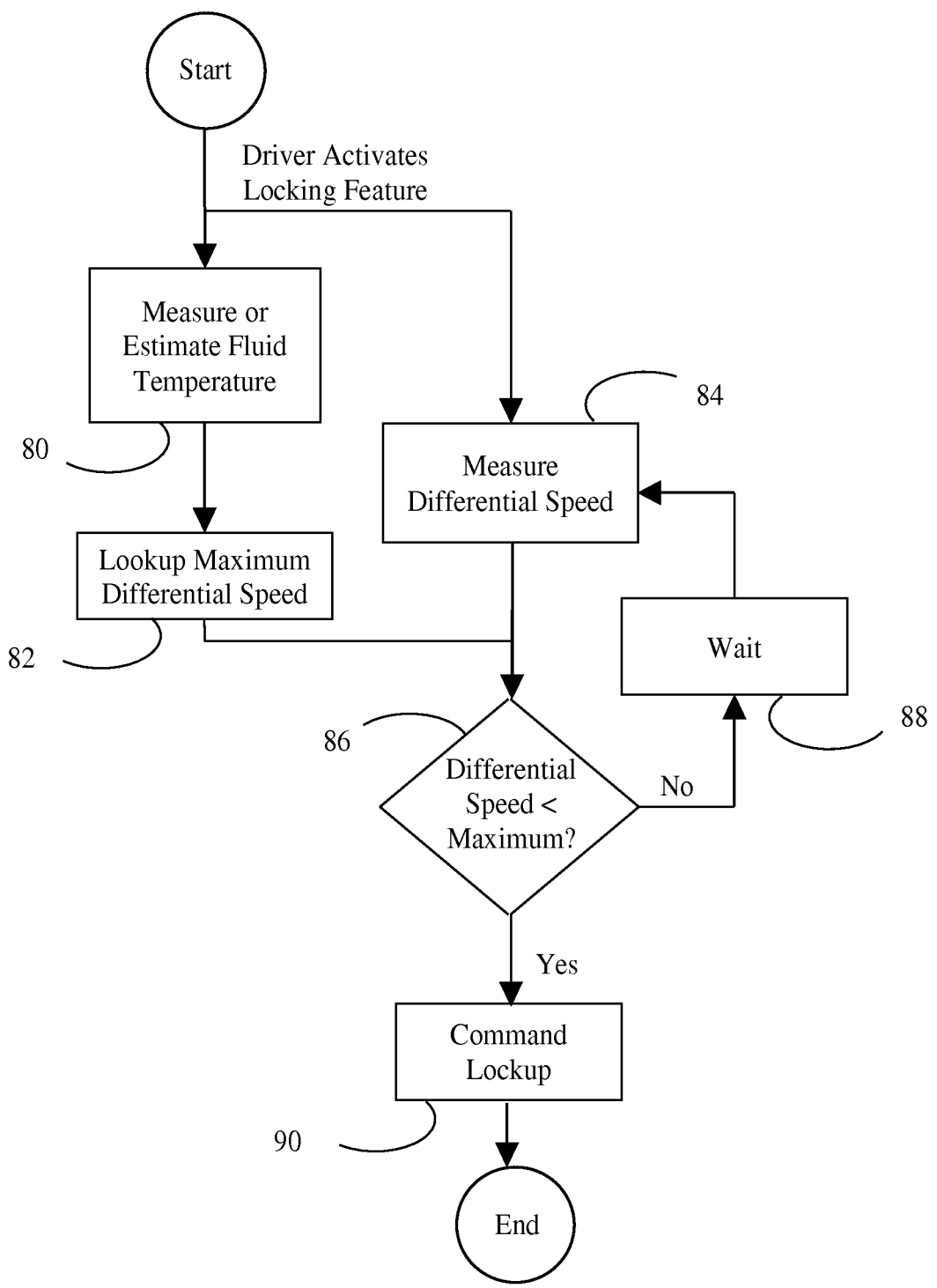
FIG. 3 is a flowchart of a method of controlling the locking differential of FIG. 2.

FIG. 3 is a flow chart for a method to control a locking differential such as the differential of FIG. 2 to avoid failed engagement attempts. The method is executed in response to driver activation of the differential locking feature, for example by manipulating a control in the vehicle cabin. At 80, the controller measures or estimates a temperature in of the fluid in the differential. For example, the controller may measure the temperature using temperature sensor 76. Alternatively, the controller may maintain an estimate of the temperature using a thermal model that considers factors such as ambient temperature, vehicle soak time (the duration of an interval that the vehicle is off), and the vehicle wheel speed and wheel torque history. As another alternative, the controller may utilize a surrogate temperature measurement of another fluid such as transmission fluid where the temperature of the other fluid tends to be correlated with the temperature of the differential fluid. At 82, the controller computes a maximum differential speed threshold as a function of differential fluid temperature. For example, the controller may use a calibrateable lookup table such as TABLE 1. At 84, the controller measures the current differential speed. For example, wheel speeds may be measured by an anti-lock braking system and conveyed to the transmission controller at regular intervals. Alternatively, the controller may measure the wheel speeds only when needed. At 86, the measured differential speed is compared to the threshold. If the current differential speed exceeds the threshold, the controller waits at 88 and then checks the speed difference again. For example, the controller may execute a routine in response to interrupts at regular intervals and check the speed difference during each execution of the routine. Alternatively, the controller may set a timer and check the speed difference again in response to an interrupt triggered by expiration of the timer. If the differential speed is less than the threshold, the controller commands engagement of the lockup clutch at 90 and the method terminates.

TABLE 1

| Temperature (degrees Fahrenheit) | Differential Speed Threshold (rpm) |
|---|---|
| −40 | 10 |
| −20 | 30 |
| 0 | 50 |
| 100 | 50 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of controlling a differential having a clutch configured to selectively operatively couple a first output shaft to a second output shaft, the method comprising:
    periodically measuring a difference between a speed of the first output shaft and a speed of the second output shaft; and
    in response to a driver-initiated locking command while the difference exceeds a threshold, waiting until the difference decreases below the threshold and then engaging the clutch.

2. The method of claim 1, further comprising adjusting the threshold in response to a change in a temperature of a differential fluid.

3. The method of claim 2 further comprising periodically measuring the temperature of the differential fluid.

4. The method of claim 2 further comprising inferring the temperature of the differential fluid based on an ambient temperature, a soak time, and a vehicle speed history.

5. The method of claim 2 further comprising:
    periodically measuring a temperature of a transmission fluid; and
    inferring the temperature of the differential fluid based on the temperature of the transmission fluid.

6. The method of claim 1 wherein the clutch is a dog clutch.

7. The method of claim 1 wherein the clutch is configured to selectively directly couple the first output shaft to a differential carrier.

8. A method of controlling a locking differential comprising:
    periodically measuring a speed difference between a first axle and a second axle;
    adjusting a threshold in response to a change in a temperature of a differential fluid; and
    in response to a driver-initiated locking command while the speed difference exceeds the threshold, waiting until the speed difference decreases below the threshold and then engaging a clutch to operatively couple the first axle to the second axle.

9. The method of claim 8 further comprising periodically measuring the temperature of the differential fluid.

10. The method of claim 8 further comprising inferring the temperature of the differential fluid based on an ambient temperature, a soak time, and a vehicle speed history.

11. The method of claim 8 further comprising:
    periodically measuring a temperature of a transmission fluid; and
    inferring the temperature of the differential fluid based on the temperature of the transmission fluid.

12. The method of claim 8 wherein the clutch is a dog clutch.

13. A locking differential comprising:
    an input shaft;
    first and second output shafts;
    gearing configured to distribute power from the input shaft to the first and second output shafts and to constrain a speed of the input to be proportional to a weighted average of a speed of the first output shaft and a speed of the second output shaft;
    a clutch configured to operatively selectively couple the first output shaft to the second output shaft; and
    a controller in communication with the clutch and with a driver-operable locking control, the controller programmed
        to adjust a threshold in response to a change in a temperature of a differential fluid, and
        in response to receiving a locking command from the driver-operable control while a speed difference between the first output shaft and the second output shaft exceeds the threshold, to wait until the speed difference decreases below the threshold and then to command engagement of the clutch.

14. The locking differential of claim 13 wherein the clutch is a dog clutch.

15. The locking differential of claim 14 wherein the dog clutch is configured to selectively directly couple the first output shaft to a differential carrier.

* * * * *